(12) United States Patent
Kubota et al.

(10) Patent No.: US 6,232,370 B1
(45) Date of Patent: May 15, 2001

(54) INK JET RECORDING INK

(75) Inventors: Kazuhide Kubota; Kazuaki Watanabe; Kiyohiko Takemoto; Toshiyuki Miyabayashi, all of Suwa (JP)

(73) Assignee: Seiko Epson Corporation, Tokyo-To (JP)

( * ) Notice: Subject to any disclaimer, the term of this patent is extended or adjusted under 35 U.S.C. 154(b) by 0 days.

(21) Appl. No.: 08/816,748

(22) Filed: Feb. 21, 1997

(30) Foreign Application Priority Data

Feb. 22, 1996 (JP) .................................................. 8-035249

(51) Int. Cl.⁷ .................................................... C09D 5/00
(52) U.S. Cl. .............................................................. 523/161
(58) Field of Search ............................................. 523/161

(56) References Cited

U.S. PATENT DOCUMENTS

| | | | | |
|---|---|---|---|---|
| 3,976,497 | * | 8/1976 | Clark ..................... | 524/789 |
| 4,269,760 | * | 5/1981 | Wakimoto ............. | 524/789 |
| 4,311,738 | * | 1/1982 | Chi ........................ | 524/783 |
| 4,411,951 | * | 10/1983 | Barsotti ................. | 524/441 |
| 4,421,660 | * | 12/1983 | Hajna .................... | 524/445 |
| 4,435,219 | * | 3/1984 | Greigger ................ | 524/711 |
| 4,439,239 | * | 3/1984 | Greigger ................ | 528/12 |
| 4,789,399 | * | 12/1988 | Williams ................ | 524/388 |
| 4,935,463 | * | 6/1990 | Stockel .................. | 524/423 |
| 5,318,886 | * | 6/1994 | Saverin .................. | 524/444 |
| 5,439,957 | * | 8/1995 | Takimoto ............... | 524/444 |
| 5,510,188 | * | 4/1996 | Vockler ................. | 428/426 |
| 5,534,585 | * | 7/1996 | Roulstone ............. | 524/413 |

FOREIGN PATENT DOCUMENTS

| | | |
|---|---|---|
| 0656406 | 6/1995 | (EP) . |
| 52-154409 | 12/1977 | (JP) . |
| 57-31591 | 2/1982 | (JP) . |
| 59-199780 | 11/1984 | (JP) . |
| 4259590 | 9/1992 | (JP) . |
| 5117562 | 5/1993 | (JP) . |
| 6322306 | 11/1994 | (JP) . |
| 8319442 | 12/1996 | (JP) . |
| 9215648 | 9/1992 | (WO) . |

OTHER PUBLICATIONS

Derwent Abstract of Japan of JP 52–154409 of Dec. 22, 1977.
Derwent Abstract of Japan of JP 51–17562 of May 14, 1983.
Patent Abstracts of Japan of JP 4–259290 of Sep. 16, 1992.
Patent Abstracts of Japan of JP 59–199780 of Nov. 12, 1984.
Patent Abstracts of Japan of JP 57–31591 of Feb. 20, 1982.
Patent Abstracts of Japan of JP 6–322306 of Nov. 22, 1994.
Patent Abstracts of Japan of JP of 8–319442 of Dec. 3, 1996.

\* cited by examiner

*Primary Examiner*—Paul R. Michl
(74) *Attorney, Agent, or Firm*—Ladas & Parry

(57) ABSTRACT

A pigment-based ink composition for ink jet recording is provided which can offer prints having excellent scratch resistance and free from uneven printing. Ink jet recording is carried out using an ink composition comprising a pigment and an inorganic oxide colloid in combination. Further, the use of a recording head equipped with a nozzle plate (101), which has been treated to form a fluoropolymer-containing plating layer (104) thereon for rendering the nozzle plate (101) water-repellent, can realize printing free from the ejection of ink droplets with trajectories non-perpendicular to the print head.

17 Claims, 2 Drawing Sheets

INK JET RECORDING INK

BACKGROUND OF THE INVENTION

1. Field of the Invention

The present invention relates to an ink composition for ink jet recording.

2. Background Art

Ink jet recording is a printing method wherein droplets of an ink composition are ejected and deposited onto a recording medium such as paper. This method has a feature that an image having a high resolution and a high quality can be printed at a high speed with a relatively inexpensive apparatus. In general, the ink composition used in the ink jet recording comprises water as a main component and, added thereto, a colorant and a wetting agent, such as glycerin, for prevention of clogging and other purposes.

Dyes and pigments are generally used as the colorant. The dyes are extensively used by virtue of good water solubility. Good water solubility of the dyes, however, results in deteriorated waterproofness of printed images. On the other hand, the pigments are essentially insoluble in water, realizing prints having excellent waterproofness. The pigments, however, should be stably dispersed in an ink composition and, in some cases, offer prints having inferior scratch resistance to the prints formed by using dyes. Further, printing using an ink composition containing a pigment as a colorant often suffers from uneven printing. The uneven printing refers to a variation in color density in the print derived from localization of a colorant on the paper. Although the uneven printing poses no significant problem in printing of letters of regular size, it is a serious problem in applications where figures, graphs and the like are printed.

SUMMARY OF THE INVENTION

The present inventors have now found that printing of a pigment-based ink composition comprising a pigment in combination with an inorganic oxide colloid by ink jet recording can offer a good image. Further, they have found that a better image can be realized by using the ink composition in combination with a recording head equipped with a nozzle plate which has been treated to render the nozzle plate water-repellent. The present invention has been made based on such novel finding.

Accordingly, an object of the present invention is to provide an ink composition, for ink jet recording, which can realize a good image.

Another object of the present invention is to provide an ink jet recording method which can realize a good image.

The ink composition for ink jet recording according to the present invention comprises at least a pigment, an inorganic oxide colloid, and an aqueous solvent.

The ink jet recording method according to the present invention comprises the steps of: ejecting droplets of an ink composition from a recording head; and depositing the droplets onto a recording medium to perform printing, wherein the above ink composition of the present invention is used as the ink composition.

DETAILED DESCRIPTION OF THE INVENTION

Ink composition

Figure 1:
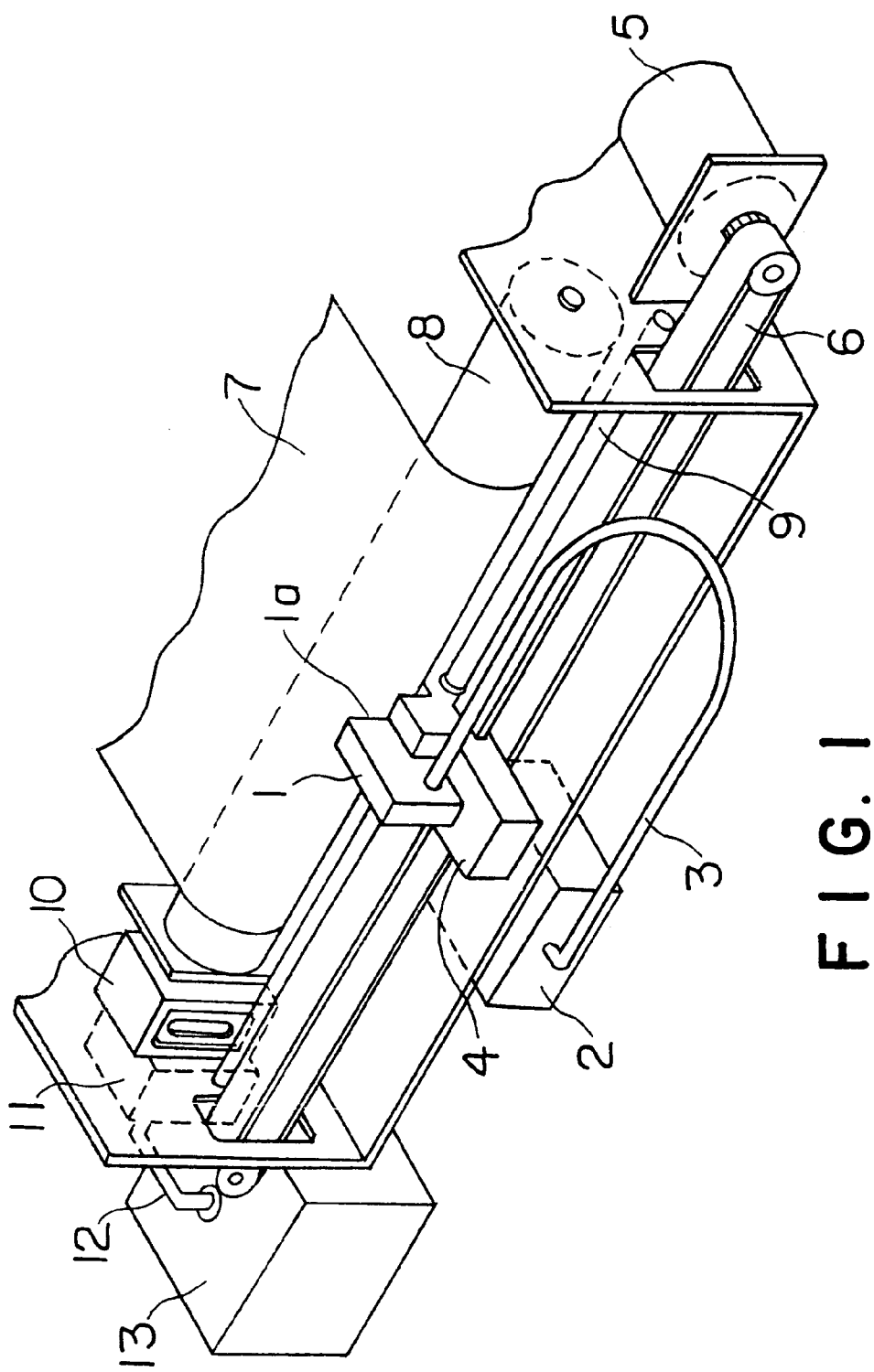
FIG. 1 is a diagram showing an embodiment of an ink jet recording apparatus for carrying out the ink jet recording method according to the present invention, wherein a recording head and an ink tank are separately provided and an ink composition is fed into the recording head through an ink tube.

The ink composition used in the present invention comprises at least a pigment, an inorganic oxide colloid, and an aqueous solvent.

The ink composition of the present invention can offer prints possessing excellent scratch resistance and free from uneven printing. According to a preferred embodiment of the present invention, the use of the ink composition according to the present invention in combination with a recording head equipped with a nozzle plate having a fluoropolymer-containing plating layer described below can surprisingly realize stable printing. More specifically, ejection of droplets with trajectories non-perpendicular to the print head can be minimized, i.e., can be inhibited on a very low level, offering an advantage of stable printing.

Inorganic oxide colloid

The inorganic oxide colloid which is also called "inorganic oxide sol" used in the present invention refers to a colloidal solution comprising: a dispersion medium composed of water or water and an organic solvent having good compatibility with water; and a dispersoid composed of ultrafine particles of an inorganic oxide. Inorganic oxides usable herein include, but are not limited to, high-molecular weight silicic anhydride ($SiO_2$) and alumina ($Al_2O_3$). The particle diameter of the ultrafine particles of the inorganic oxide is generally about 1 to 100 nm, preferably 1 to 20 nm, more preferably 1 to 10 nm. The dispersion medium for the inorganic oxide colloid is generally water or a mixed solvent composed of water and an organic solvent having good compatibility with water, for example, methanol, ethanol, isopropyl alcohol, or n-propanol. The inorganic oxide colloid is prepared by dispersing ultrafine particles of the inorganic oxide into water or the above organic solvent. A dispersion of the ultrafine particles in water is called an "aqueous sol," and a dispersing of the ultrafine particles in an organic solvent is called an "organosol."

The inorganic oxide colloid may be a commercially available one, and specific examples thereof include: Snowtex S, Snowtex N, Snowtex C, Snowtex SS, Snowtex XS, Snowtex 20, Snowtex 30, and Snowtex 40, manufactured by Nissan Chemical Industry Ltd., Cataloid SI-350, Cataloid SI-500, Cataloid SI-30, Cataloid S-20L, Cataloid S-20H, Cataloid S-30L, Cataloid S-30H, and Cataloid SI-40, manufactured by E. I. du Pont de Nemours & Co.) which are dispersions of ultraviolet particles of high-molecular weight silicic anhydride in water; Aluminasol 100, Aluminasol 200, and Aluminasol 520, manufactured by Nissan Chemical Industry Ltd., which are dispersions of ultrafine particles of alumina in water; and OSCAL-1432 (isopropyl alcohol sol, manufactured by Catalysts and Chemicals Industries Co., Ltd.) which is a dispersion of ultrafine particles of high-molecular weight silicic anhydride in an organic solvent. Most of the commercially available colloidal solutions of inorganic oxides have pH adjusted to the acidic or alkaline.

This is because the pH region where the inorganic oxide colloid exists stably is on the acidic or alkaline side. Therefore, when the addition of a commercially available inorganic oxide colloidal solution to the ink is contemplated, it should be made by taking into consideration the pH region, where the inorganic oxide colloid exists stably, and the pH value of the ink.

The amount of the inorganic oxide colloid added may be suitably determined by taking into consideration the type and agglomerate. In general, however, it is preferably about 0.1 to 15% by weight, more preferably about 0.5 to 5.0% by weight, based on the ink composition. A plurality of inorganic oxide colloids may be added.

Colorant

The colorant contained in the ink composition according to the present invention is a pigment. In the present invention, the following wide variety of pigments may be utilized. Both inorganic and organic pigments are usable. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersants and surfactants.

The amount of the pigment added to the ink is preferably about 0.5 to 25% by weight, more preferably about 2 to 15% by weight.

Aqueous Solvent

The aqueous solvent as a main solvent of the ink composition of the present invention comprises basically an water-soluble organic solvent and water. The water-soluble organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the aqueous solvent further comprises a wetting agent comprising a high-boiling organic solvent. Preferred examples of high-boiling organic solvents usable herein include polyhydric alcohols such as ethylene glycol, diethylene glycol, triethylene glycol, polyethlene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of from 0.5 to 40% by weight, more preferably in the range of from 2 to 20% by weight, based on the ink. The amount of the low-boiling organic solvent added is preferably 0.5 to 10% by weight, more preferably in the range of from 1.5 to 6% by weight, based on the ink.

The ink composition used in the present invention may contain a surfactant. Preferred examples thereof include surfactants such as anionic surfactants, nonionic surfactants, and amphoteric surfactants, alcohol such as methanol, and iso-propyl alcohol, and polyalcohol lower alkyl ether such as ethylene glycol mono-methyl ether, diethylene glycol mono-methyl ether, diethylene glycol mono-butyl ether, triethylene glycol mono-butyl ether, propylene glycol monomethyl ether, and dipropylene glycol mono-methyl ether.

Further, if necessary, pH adjustors, preservatives, antimolds and the like may be added. Examples of pH adjustors include KOH, NaOH, triethanolamine.

Saccharide

The ink composition used in the present invention may further comprise a saccharide. The addition of the saccharide can further improve the color density, minimizing feathering and uneven printing. Further, in the case of a color image, color bleeding can be prevented on a high level. Specific examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "poloysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

Epoxy-containing compound

According to a preferred embodiment of the present invention, the ink composition according to the present invention contains an epoxy-containing compound. The addition of this compound can further improve scratch resistance of the print. The term "epoxy-containing compound" used herein means a compound which has at least two epoxy groups in its molecular structure and causes a crosslinking reaction, in which an epoxy group is involved, resulting in resinification (i.e., increased molecular weight). The addition of the epoxy-containing compound permits good scratch resistance and water resistance to be imparted to the printed image.

Epoxy-containing compounds usable in the present invention include compounds containing an epoxy group and, in addition, a functional group reactive with an epoxy group.

The term "functional group reactive with an epoxy group" used herein means a functional group which is reacted with an epoxy group to cause crosslinking, and examples of such functional groups include hydroxyl, carboxyl, and sulfonic groups.

In this context, it should be noted that a reaction between the epoxy-containing compounds each having a functional group reactive with an epoxy group in the ink composition is apparently unfavorable. Therefore, preferably, use of such epoxy-containing compounds is avoided.

Epoxy-containing compounds which may be preferably used in the present invention include epoxy-containing resin emulsions.

According to a preferred embodiment of the present invention, epoxy-containing resin emulsions include an epoxy-containing acrylic resin emulsion comprising: a continuous phase of water; and a dispersed phase comprising a copolymer comprised of recurring units represented by the following formulae (I) and (II):

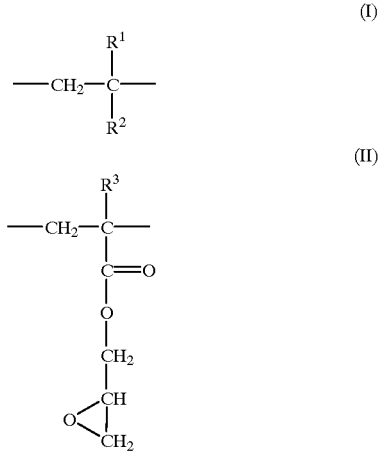

wherein $R^1$ and $R^3$ each independently represent H or $CH_3$;

$R^2$ represents a group containing in its structure at least one group selected from alkyl (with $C_{1-21}$ alkyl being preferred), hydroxyl, carboxyl and sulfonic groups. This resin is not limited by the form of copolymers, and, for example, a block copolymer and a random copolymer are possible.

For the above copolymers, the terminal thereof has no essential influence on the properties because the polymer has a high molecular weight. In general, a fragment of a polymerization initiator constitutes the terminal, and examples of such fragments include fragments of ammonium persulfate and potassium persulfate, such as $—OSO_3H$.

Examples of preferred $R^2$ include $—OH$, $—COOH$, or $—COO—R$ (wherein R represents a straight or branched alkyl group, preferably a $C_{1-12}$ alkyl group with at least one hydrogen atom on the alkyl group being optionally substituted by a hydroxyl, phosphono, or sulfonic group), and an aryl group substituted by a sulfonic group such as for example, a phenyl or tolyl group. Specific examples of the group represented by $R^2$ include $—OH$, $—COOH$, $—COOCH_2CH_2OH$, $—COOCH_2CH(CH_3)OH$, $—COOCH_2CH_2PO(OH)_2$, $—C_6H_5SO_3H$, $—COOCH_2CH_2SO_3H$, $—COOCH_3$, $—COOC_2H_5$, $—COOC_4H_9$, $—COOC_6H_{13}$, $—COO(CH_2)_{11}CH$, and $—COOCH_2CH(CH_3)CH_2C(CH_3)_3$. In this context, a hydroxyl, carboxyl, or sulfonic group which may be contained in $R^2$ is a functional group reactive with an epoxy group.

Commercially available resin emulsions may be used, and examples thereof include Almatex Z116 (manufactured by Mitsui Toatsu Chemicals, Inc.), NEW COAT S2170 and NEW COAT S-1080 (manufactured by Shin-Nakamura Chemical Co., Ltd.), VANATEX #952 and VANATEX HG-9 (manufactured by Shin-Nakamura Chemical Co., Ltd.), and Piestex B-3 (manufactured by Shin-Nakamura Chemical Co., Ltd.).

The content of the epoxy-containing compound in the ink composition according to the present invention is preferably about 1 to 10% by weight, more preferably 1 to 5% by weight, based on the ink composition.

The ink composition used in the present invention may contain a resin emulsion as described below. When the above epoxy-containing compound is an epoxy-containing resin emulsion, it serves also as the resin emulsion. Therefore, use of an additional resin emulsion is unnecessary. However, according to a preferred embodiment of the present invention, the resin emulsion is added in combination with the epoxy-containing resin emulsion.

Resin emulsion

According to a preferred embodiment of the present invention, the ink composition used in the present invention contains a resin emulsion. The addition of this compound can further improve scratch resistance of the print. A preferred resin emulsion comprises a continuous phase of water and a dispersed phase comprising a resin not containing an epoxy group. As described above, when the epoxy-containing compound is an epoxy-containing resin emulsion, the addition of the resin emulsion is not essential. Resins usable herein include acrylic resin, vinyl acetate resin, styrene-butadiene resin, vinyl chloride resin, (meth) acrylate-styrene resin, butadiene resin, and styrene resin.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

According to a preferred embodiment of the present invention, the resin is a polymer having a combination of a hydrophilic segment with a hydrophobic segment. The particle diameter of the resin component is not particularly limited so far as the resin component forms an emulsion. It, however, is preferably not more than about 150 nm, more preferably about 5 to 100 nm.

The resin emulsion may be prepared by subjecting a monomer(s) for forming a contemplated resin to dispersion polymerization in water optionally in the presence of a surfactant. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water optionally in the presence of a surfactant. In general, the ratio of the resin component to the surfactant is preferably about 10:1 to 5:1. When the amount of the surfactant used falls within the above range, it is possible to provide an ink which has good water resistance in the form of an image and good penetrability. The surfactant is not particularly limited. Preferred examples thereof include anionic surfactants (for example, sodium dodecylbenzenesulfonate, sodium laurate and an ammonium slat of a polyoxyethylene alkyl ether sulfate); nonionic surfactants having 10 or more of HLB value (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

In the ink used in the present invention, the amount of the resin emulsion incorporated therein is preferably such that the amount of the resin component is in the range of from 0.1 to 40% by weight, more preferably in the range of from 1 to 25% by weight.

Ink jet recording method and recording device

According to a preferred embodiment of the present invention, the ink composition of the present invention may be preferably used in an ink jet recording method using a recording head equipped with a nozzle plate having on its surface a fluoropolymer-containing plating layer. The use of the ink composition in combination with this recording method can minimize and inhibit the ejection of droplets with trajectories non-perpendicular to the print head on a very low level, resulting in an advantage of stable printing.

FIG. 1 is a diagram showing an embodiment of an ink jet recording apparatus. In this embodiment, an ink composition is accommodated in a tank and fed into a recording head through an ink tube. Specifically, a recording head 1 is communicated with an ink tank 2 through an ink tube 3.

The recording head 1 is carried by a carriage 4 and moved along a guide 9 by a timing belt 6 driven by a motor 5. On the other hand, paper 7 as a recording medium is placed by a platen 8 at a position facing the recording head 1. In this embodiment, a cap 10 is provided. A suction pump 11 is connected to the cap 10 in order to conduct the so-called "cleaning operation." The ink composition sucked by the pump 11 is resorvoired in a waste ink tank 13 through a tube 12.

Figure 2:
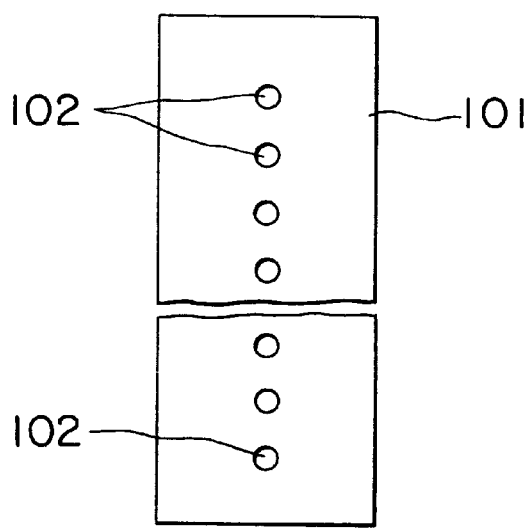
FIG. 2 is a diagram showing a nozzle plate of a recording head which may be preferably used in combination with the ink composition of the present invention, wherein a nozzle plate 101 has a plurality of nozzles 102, for ejecting an ink composition, arranged in longitudinal direction.
Figure 3:
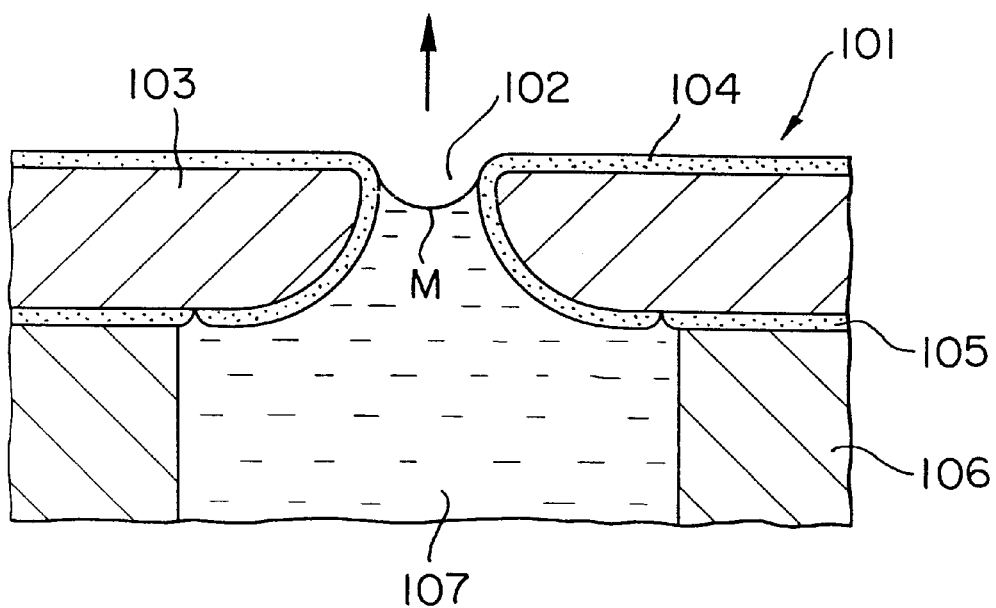
FIG. 3 is a cross-sectional enlarged view of a portion around a nozzle 102 provided on a nozzle plate 101, wherein the nozzle plate 101 comprises a substrate 103 and a fluoropolymer-containing plating layer 104 provided on the substrate 103.

FIG. 2 is an enlarged view of a nozzle plate in the recording head 1. A nozzle plate 101 comprises a plurality of nozzles 102, for ejecting an ink composition, arranged in longitudinal direction. FIG. 3 is a cross-sectional enlarged view of a portion around the nozzle 102.

In FIG. 3, the nozzle plate 101 comprises a substrate 103 and a fluoropolymer-containing plating layer 104. The nozzle plate 101 is adhered to a nozzle base 106 through an adhesive layer 105 to constitute an ink chamber 107. The ink chamber 107 is filled with an ink composition, and, for example, a meniscus of the ink is formed as indicated by M in the drawing. The ink composition in the ink chamber 107 is pressed by an actuator (not shown) and ejected through the nozzle 102 toward a direction indicated by an arrow in the drawing.

The substrate 103 may be made of a metal, ceramic, silicon, glass, plastic or the like, and preferred materials for the substrate 103 include single metals such as titanium, chromium, iron, cobalt, nickel, copper, zinc, tin, and gold; alloys, such as nickel-phosphorus alloy, tin-copper-phosphorus alloy (phosphor bronze), copper-zinc alloy, and stainless steel; and resins, such as polycarbonate, polysulfone, ABS resin (acrylonitrile-butadiene-styrene copolymer), polyethylene terephthalate, polyacetal, and various photosensitive resins.

the fluoropolymer-containing plating layer 104 is formed on the surface of the substrate 103 by the following eutectoid plating treatment. At the outset, the surface of the substrate is washed with an acid, and the substrate is then immersed in a liquid prepared by dispersing particles of a fluoropolymer in an aqueous solution containing a matrix metal ion. This permits particles of the fluoropolymer to be deposited onto the surface of the substrate 103 through the matrix metal ion to form a layer. thereafter, the layer is heated to the melting point of the fluoropolymer or above, for example, a temperature of about 350° C. or above, to form a homogeneous plating layer 104. Examples of fluoropolymers include polytetrafluoroethylene, polyperfluoroalkoxybutadiene, polyfluorovinylidene, polyfluorovinyl, and polydiperfluoroalkyl fumarate and polymers represented by the following formulae (I) to (V). These polymers may be used alone or as a mixture of two or more.

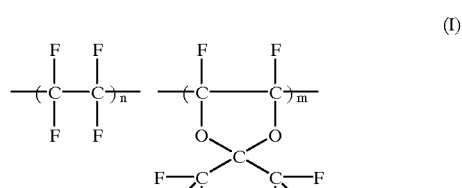
(I)

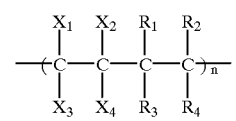
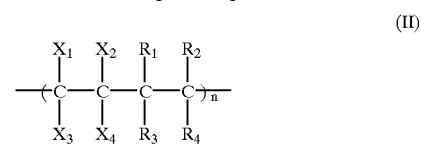
(II)

where at least two of $X_1$ to $X_4$ are fluorine or perfluoroalkyl group, the others are alkyl, preferably $C_{1-20}$ alkyl, and $R_1$ to $R_4$ are hydrocarbon substituent (including hydrogen and halogen).

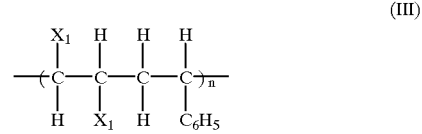
(III)

where $X_1$ is $COOC_mF_{2M+1}$ (wherein m=1-20).

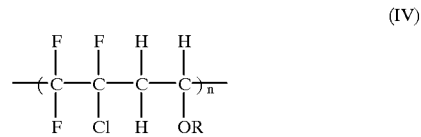
(IV)

where R is alkyl, preferably $C_{1-20}$ alkyl.

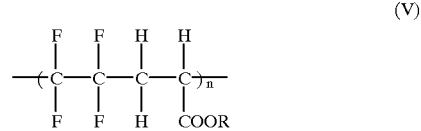
(V)

where R is alkyl, preferably $C_{1-20}$ alkyl.

Preferred matrix metal ions include metal ions of nickel, copper, silver, zinc, and tin, and more preferred are nickel, nickel-cobalt alloy, nickel-phosphorus alloy, and nickel-boron alloy from the viewpoints of high large surface hardness and excellent abrasion resistance.

The thickness of the fluoropolymer-containing plating layer 104 is preferably 1 to 10 μm from the viewpoints of ensuring ink repellency and the precision of the diameter of ink ejection port. The content of the eutectoid fluoropolymer in the plating layer 10 is preferably not more than 60% by volume, particularly preferably about 10 to 50% by volume.

Eutectoid plating may be performed by any of electroless plating and electroplating. However, electroplating is preferred because it is less likely to be influenced by ion species contained in the ink composition and can form a highly durable plating layer. Further, in heating the resultant layer to the melting point of the fluoropolymer or above, the application of a pressure of not less than 100 gf/cm$^2$, preferably 500 gf/cm$^2$, is preferred from the viewpoint of preventing the warpage of the nozzle plate 101.

EXAMPLES

The present invention will now be described in more detail with reference to the following examples, though it is not limited to these examples only.

Preparation of ink compositions

The following ink compositions were prepared. Specifically, carbon black and the dispersant were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed, and the remaining additives were added, and the mixture was stirred at room temperature for 20 min and then filtered through a 5-μm membrane filter to prepare an ink for ink jet recording.

| Example 1 | |
|---|---|
| Carbon black MA7 (manufactured by Mitsubishi Kasei Corp.) | 5% by weight |
| Styrene/acrylic acid copolymer (dispersant) | 1% by weight |
| Snowtex S (colloidal silica, SiO$_2$ content 30%, manufactured by Nissan Chemical Industry Ltd.) | 10% by weight |
| Glycerin | 10% by weight |
| 2-Pyrrolidone | 2% by weight |
| Pure water | Balance |
| Example 2 | |
| Carbon black Raven 1080 (manufactured by Columbian Carbon) | 5% by weight |
| Styrene/acrylic acid copolymer (dispersant) | 1% by weight |
| Snowtex S (colloidal silica, SiO$_2$ content 20%, manufactured by Nissan Chemical Industry Ltd.) | 0.5% by weight |
| Sucrose | 0.7% by weight |
| Malitol | 6.3% by weight |
| Glycerin | 10% by weight |
| 2-Pyrrolidone | 2% by weight |
| Pure water | Balance |
| Example 3 | |
| Carbon black MA7 (manufactured by Mitsubishi Kasei Corp.) | 5% by weight |
| Styrene/acrylic acid copolymer (dispersant) | 1% by weight |
| Aluminasol-200 (Al$_2$O$_3$ content 10%, manufactured by Nissan Chemical Industry Ltd.) | 5% by weight |
| Voncoat 4001 (acrylic resin emulsion, resin content 50%, MFT 5° C., manufactured by Dainippon Ink and Chemicals, Inc.) | 5% by weight |
| Glycerin | 10% by weight |
| 2-Pyrrolidone | 2% by weight |
| Pure water | Balance |
| Example 4 | |
| Carbon black Raven 1080 (manufactured by Columbian Carbon Co., Ltd.) | 5% by weight |
| Styrene/acrylic acid copolymer (dispersant) | 1% by weight |
| Colloidal silica S | 5% by weight |
| Almatex Z116 (epoxy-containing acrylic resin emulsion, resin content 50%, manufactured by Mitsui Toatsu Chemicals, Inc.) | 3% by weight |
| Glycerin | 10% by weight |
| 2-Pyrrolidone | 2% by weight |
| Pure water | Balance |
| Comparative Example | |
| Carbon black Raven 1080 (manufactured by Columbian Carbon Co., Ltd.) | 5% by weight |
| Styrene/acrylic acid copolymer (dispersant) | 1% by weight |
| Glycerin | 10% by weight |
| 2-Pyrrolidone | 2% by weight |
| Pure water | Balance |

Evaluation Tests

The properties of the above ink compositions were evaluated as follows.

Evaluation 1: Rubbing property

An ink jet printer MJ-700V2C was used to perform printing on Xerox P paper (manufactured by Xerox Corp.), and the resultant prints were air-dried for 24 hr. The prints were rubbed with a finger under an environment of 25° C. and 50% RH and then observed by visible inspection for the presence of a stain on the print. The results were as tabulated in the following table. In the table, the evaluation criteria were as follows.

○: No stain observed in the print

Δ: Slight stain observed in the print with the letter being still legible

X: Stain observed in the print rendering the letter illegible

Evaluation 2: Fixability onto specialty media

An ink jet printer MJ-700V2C was used to print an ink on a specialty gloss paper for MJ-700V2C (manufactured by Seiko Epson Corporation), and the resultant prints were air-dried for 24 hr. The prints were rubbed with a finger under an environment of 25° C. and 50% RH and then visually inspected for the presence of a stain on the print and the separation of the colorant. The results were as tabulated in the following table. In the table, the evaluation criteria were as follows.

○: Neither stain nor separated colorant observed in the print

Δ: Slight stain observed in the print with separated colorant not observed in the print X: Both stain and separated colorant observed in the print Evaluation 3: Unevenness of printing An ink jet printer MJ-700V2C was used to perform printing (100% duty) on the following various papers.

Papers for evaluation (1) Ricopy 6200 Paper (Ricoh Co. Ltd.)

(2) Canon dry Paper (Canon Inc.)

For the resultant print images, the reflection OD was measured with Macbeth PCMII (manufactured by Macbeth). This measurement was performed for randomly selected five points in the print area, and the average of the measured values was determined.

This procedure was repeated five times, and the maximum value and the minimum value in the five average values were determined. When the difference between the maximum value and the minimum value is less than 0.5, there is no problem for practical use with the difference being preferably less than 0.4. The results were as tabulated in Table. In the results given in the table, the evaluation criteria were as follows.

○: OD difference of less than 0.3

Δ: OD difference of 0.3 to less than 0.4

X: OD difference of not less than 0.4

Evaluation 4: Ejection stability

The ink was filled into an ink jet printer MJ-700V2C (manufactured by Seiko Epson Corporation), alphabetical letters were continuously printed at room temperature, during which time the prints thus formed were inspected for dropouts and scattering of the ink to determine the time taken for the dropout and ink scattering to occur ten times. The results are summarized in the following table. In the table, the evaluation criteria are as follows.

⊚: Neither dropouts nor ink scattering occurred ten times for not less than 48 hr.

○: Dropouts or ink scattering occurred ten times during a period between 24 hr after the initiation of the printing and 48 hr after the initiation of the printing.

Δ: Dropouts or ink scattering occurred ten times during a period between 1 hr after the initiation of the printing and 24 hr after the incitation of the printing.

X: Dropouts or ink scattering occurred ten times within 1 hr from the initiation of the printing.

TABLE

| | Evaluation Test | | | |
|---|---|---|---|---|
| | 1 | 2 | 3 | 4 |
| Example 1 | ○ | ○ | ○ | ⊚ |
| Example 2 | ○ | ○ | ○ | ⊚ |
| Example 3 | ○ | ○ | ○ | ⊚ |
| Example 4 | ○ | ○ | ○ | ⊚ |
| Comparative Example | X | X | X | Δ |

What is claimed is:

1. An ink composition for ink jet recording having components comprising at least a colorant selected from the group consisting of carbon black and an organic pigment, an inorganic colloid, a resin emulsion and an aqueous solvent, said components being present in respective amounts sufficient to allow the ink composition to be ejected from a recording head and deposited on a recording medium to form a print with the colorant evenly distributed in the print.

2. The ink composition according to claim 1, wherein the inorganic oxide colloid is colloidal silica.

3. The ink composition according to claim 1, further comprising a saccharide.

4. The ink composition according to claim 1, wherein the resin emulsion is an epoxy-containing resin emulsion or the ink composition further comprises an epoxy containing compound having a functional group reactive with an epoxy group.

5. The ink composition according to claim 4, wherein the resin emulsion is an epoxy-containing resin emulsion.

6. The ink composition according to claim 5, wherein the epoxy-containing resin emulsion comprises a copolymer comprising recurring units represented by the following formulae (I) and (II):

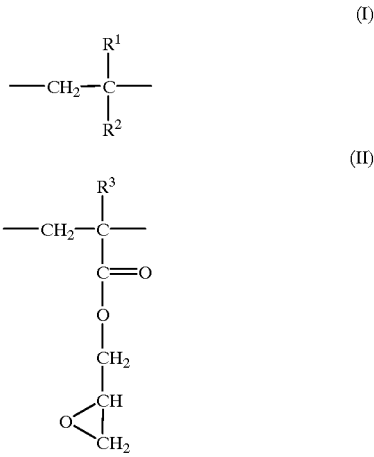

wherein $R^1$ and $R^3$ independently represent H or $CH_3$, $R^2$ represents a group containing at least one member selected from alkyl, hydroxyl, carboxyl, and sulfonic groups.

7. The ink composition according to any one of claims 1–3 or 4–6, which is usable for ink jet recording with a recording head equipped with a nozzle plate having a fluoropolymer-containing plating layer.

8. The ink composition according to claim 7, wherein the fluoropolymer-containing plating layer is obtainable by an eutectoid plating method.

9. A ink jet recording method comprising the steps of: ejecting droplets of an ink composition with an ink jet recording head, and depositing the droplet onto a recording medium to perform printing, wherein the ink composition is the ink composition according to any one of claims 1–3 or 4–7.

10. The ink composition according to claim 1, wherein the ink composition consists essentially of said colorant, said inorganic oxide colloid, said resin emulsion and said aqueous solvent, said colorant being present in the ink composition in an amount of between 0.5 to 25% by weight, said inorganic oxide colloid being present in the ink composition in an amount of between 0.1 to 15% by weight, and said resin emulsion being present in the ink composition in an amount of 0.1 to 40% by weight.

11. The in jet recording method according to claim 9, wherein the fluoropolymer-containing plating layer is obtainable by an eutectoid plating method.

12. A combination comprising the ink composition of claim 10 and ink jet recording head means, including an ink jet recording head, for ejecting droplets of the ink composition onto a recording medium.

13. The ink composition according to claim 4, wherein the resin emulsion does not contain an epoxy group, wherein the ink composition consists essentially of said colorant, said inorganic oxide colloid, said resin emulsion, said epoxy-containing compound, and said aqueous solvent, said colorant being present in the ink composition in an amount of between 0.5 to 25% by weight, said inorganic oxide colloid being present in the ink composition in an amount of between 0.1 to 15% by weight, said resin emulsion being present in the ink composition in an amount of 0.1 to 40% by weight and said epoxy-containing compound being present in the ink composition in an amount of 1 to 10% by weight.

14. The ink composition according to claim 1, wherein the ink composition consists essentially of said saccharide, said inorganic oxide colloid, said resin emulsion and said aqueous solvent, said colorant being present in the ink composition in an amount of between 0.5 to 25% by weight, said inorganic oxide colloid being present in the ink composition in an amount of between 0.1 to 15% by weight, said resin emulsion being present in the ink composition in an amount of 0.1 to 40% by weight, and said saccharide being present in the ink composition in an amount of 0.5 to 30% by weight.

15. The combination of claim 10, wherein the ink jet recording head has a nozzle plate having a fluoropolymer-containing plating layer.

16. An ink composition according to claim 4 further comprising a dispersant which is a styrene/acrylic acid copolymer, said composition consisting essentially of:

carbon black 5% by weight styrene/acrylic acid copolymer 1% by weight colloidal silica 5% by weight epoxy-containing acrylic resin emulsion 3% by weight glycerin 10% by weight 2-pyrrolidone 2% by weight water balance.

17. An ink composition according to claim 1, wherein the components are present in respective amounts such that the ink composition is ejectable from an ink jet recording head to form a print wherein the difference between a maximum optical density value of the print and a minimum optical density of the print is less than 0.4.

* * * * *